(No Model.)
J. A. JOHNSON.
VEHICLE SHAFTS.
No. 326,505. Patented Sept. 15, 1885.
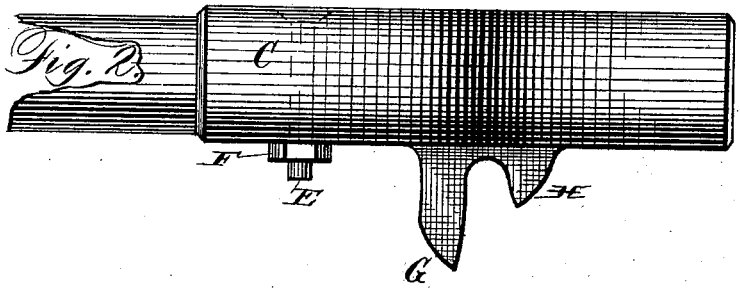
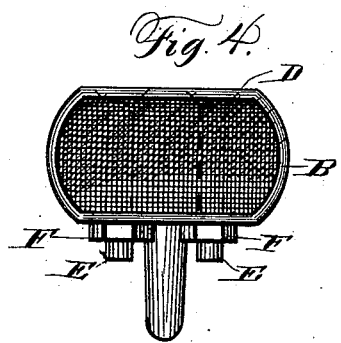 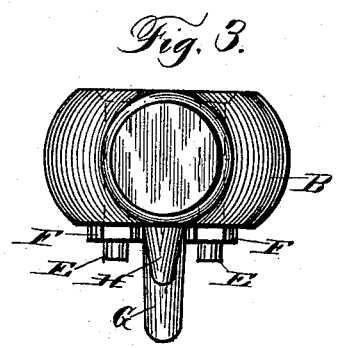
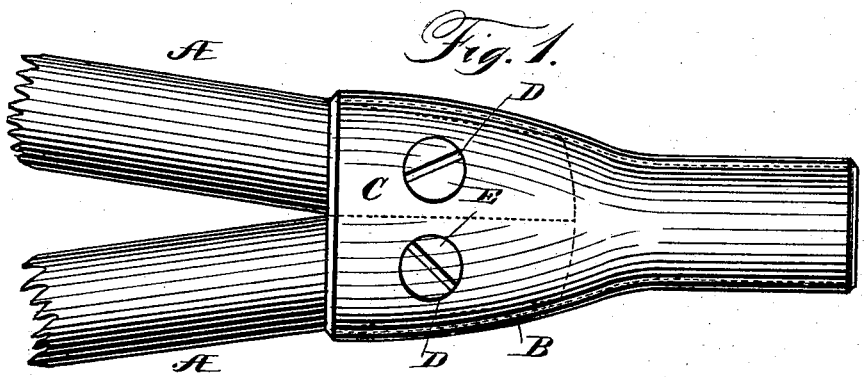
WITNESSES:
Wm. H. Denton
Arthur L. Morsell
John A. Johnson
INVENTOR,
BY Louis Bagger & Co.
ATTORNEYS

United States Patent Office.

JOHN A. JOHNSON, OF MADISON, WISCONSIN.

VEHICLE-SHAFTS.

SPECIFICATION forming part of Letters Patent No. 326,505, dated September 15, 1885.

Application filed July 6, 1885. (No model.)

*To all whom it may concern:*

Be it known that I, JOHN A. JOHNSON, a citizen of the United States, and a resident of Madison, in the county of Dane and State of Wisconsin, have invented certain new and useful Improvements in Thimbles for Sulky Hay-Rake Shafts; and I do hereby declare that the following is a full, clear, and exact description of the invention, such as will enable others skilled in the art to which it appertains to make and use the same, reference being had to the accompanying drawings, which form a part of this specification, and in which—

Figure 1 is a top view of my improved thimble for uniting the ends of sliding vehicle-shafts. Fig. 2 is a side view of the same. Fig. 3 is a front view, and Fig. 4 is a rear view of the thimble.

Similar letters of reference indicate corresponding parts in all the figures.

My invention has relation to that class of vehicle-shafts which slide at their inner ends so that they may be brought together close enough to be used as a tongue when it is desired to use a double team; and it consists in the improved construction and combination of parts of a thimble which may be secured upon the united ends of the shafts, securing the shafts together and serving as means of attachment for the ring of the yoke or breast-straps, as hereinafter more fully described and claimed.

In the accompanying drawings, the letters A A indicate the ends of the shafts, and B the thimble, the rear end of which is wide and flat, as shown at C, for the reception of the ends of the shafts. This wide end of the thimble is provided with two vertical perforations, D D, which register with corresponding perforations in the ends of the shafts, and bolts E E pass through these perforations and are secured by means of nuts F or similar means, the bolts securing the thimble to the ends of the shafts.

The under side of the thimble is provided with two downwardly-projecting lugs, G and H, which serve to confine the ring of the yoke or neck-straps of the team, and the said lugs are preferably cast in one piece with the thimble.

It will be seen that the shafts may be slid at their inner ends so as to bring their outer ends together, whereupon the thimble may be placed upon the united ends and secured by means of the bolts, when the shafts may serve as a tongue, allowing a double team to be used.

It follows that this device may be used on all classes of vehicles; but this class of sliding shafts are preferably used on horse hay-rakes, cultivators, or similar agricultural implements.

Having thus described my invention, I claim and desire to secure by Letters Patent of the United States—

1. A thimble for uniting the ends of sliding vehicle-shafts, having its rear end wide and flat for the reception of the ends of the shafts, and having registering vertical perforations for fastening-bolts, and having a pair of downwardly-projecting lugs upon the under side of its contracted forward end for confining the yoke-ring, as and for the purpose shown and set forth.

2. The combination of a pair of sliding shafts having vertical perforations near their outer ends, a thimble having its rear end wide and flat for the reception of the shafts, and having vertical perforations in that end registering with the perforations of the shafts, and having downwardly-projecting lugs upon the under side of its contracted forward end for confining the yoke-ring, and nutted bolts passing through the perforations in the thimble and shafts, as and for the purpose shown and set forth.

In testimony that I claim the foregoing as my own I have hereunto affixed my signature in presence of two witnesses.

JOHN A. JOHNSON.

Witnesses:
W. R. BAGLEY,
F. W. HOYT.